(12) United States Patent
Kise

(10) Patent No.: US 7,161,718 B2
(45) Date of Patent: Jan. 9, 2007

(54) CONTROLLER, IMAGE FORMING SYSTEM, CALIBRATION CONTROL METHOD, CALIBRATION CONTROL PROGRAM, AND MEMORY MEDIUM STORING THEREIN CALIBRATION CONTROL PROGRAM

(75) Inventor: Takashi Kise, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 811 days.

(21) Appl. No.: 09/964,656

(22) Filed: Sep. 28, 2001

(65) Prior Publication Data
US 2002/0044307 A1 Apr. 18, 2002

(30) Foreign Application Priority Data
Oct. 2, 2000 (JP) ............... 2000-302028
Sep. 25, 2001 (JP) ............... 2001-290931

(51) Int. Cl.
H04N 1/46 (2006.01)

(52) U.S. Cl. ............ 358/504; 358/406; 358/1.15; 358/1.9; 358/1.13; 358/1.16; 399/8; 399/1; 400/120.09; 709/203; 709/219

(58) Field of Classification Search ............... 358/504, 358/406, 1.15, 1.9, 442, 1.16, 1.13; 399/8, 399/1; 400/120.09; 709/203, 219; 710/1
See application file for complete search history.

(56) References Cited

U.S. PATENT DOCUMENTS

| | | | | |
|---|---|---|---|---|
| 5,802,260 A | * | 9/1998 | Shimakawa et al. | 358/1.15 |
| 5,815,764 A | * | 9/1998 | Tomory | 399/1 |
| 5,920,405 A | * | 7/1999 | McIntyre et al. | 358/442 |
| 5,933,676 A | * | 8/1999 | Ohno | 399/8 |
| 5,950,036 A | * | 9/1999 | Konishi | 399/8 |
| 5,987,225 A | * | 11/1999 | Okano | 358/1.13 |
| 6,048,117 A | * | 4/2000 | Banton | 400/120.09 |
| 6,160,968 A | * | 12/2000 | Noda | 399/8 |
| 6,412,022 B1 | * | 6/2002 | Kumpf et al. | 710/1 |
| 6,498,656 B1 | * | 12/2002 | Mastie et al. | 358/1.15 |
| 6,519,053 B1 | * | 2/2003 | Motamed et al. | 358/1.16 |
| 6,573,910 B1 | * | 6/2003 | Duke et al. | 715/740 |
| 2003/0011805 A1 | * | 1/2003 | Yacoub | 358/1.15 |
| 2003/0090688 A1 | * | 5/2003 | Kimura | 358/1.9 |

OTHER PUBLICATIONS

U.S. Appl. No. 09/774,037, filed Jan. 31, 2001.

* cited by examiner

Primary Examiner—Kimberly A. Williams
Assistant Examiner—Beniyam Menberu
(74) Attorney, Agent, or Firm—Fitzpatrick, Cella, Harper & Scinto

(57) ABSTRACT

A device is allowed to execute a job which is related to calibration work. Inconvenience such that a general job other than the calibration work is erroneously executed by a printer or a copier whose calibration is being executed is prevented. For this purpose, according to the invention, information showing that the calibration of an image forming apparatus is being executed is stored, and a job assigned to the image forming apparatus whose calibration is being executed is assigned to another image forming apparatus.

20 Claims, 10 Drawing Sheets

FIG. 5

JOB MANAGEMENT INFO

| JOB ID | | 50 |
|---|---|---|
| DATE/TIME | | 51 |
| PRIORITY | | 52 |
| PAPER SIZE/QUANTITY | | 53 |
| PRINTER TO OUTPUT | PRINTER ID | 54 |
| | PRINT ORDER | 55 |
| | ESTIMATED START DATE/TIME | 56 |
| | ESTIMATED END DATE/TIME | 57 |
| JOB STATUS | | 58 |

FIG. 6

PRINTER MANAGEMENT INFO

| PRINTER ID | | 60 |
|---|---|---|
| STATUS | CONTROL | 61 |
| | PRINTER | 62 |
| PRINTER INFO | | 63 |
| JOB LIST | | 64 |
| ESTIMATED JOB END DATE/TIME | | 65 |

FIG. 8

JOB MANAGEMENT INFO

| JOB ID | | 80 |
|---|---|---|
| DATE/TIME | | 81 |
| PRIORITY | | 82 |
| PRINT/SCAN ; PAPER SIZE/QUANTITY | | 83 |
| PRINTER TO OUTPUT | DEVICE ID | 84 |
| | PRINT/SCAN ORDER | 85 |
| | ESTIMATED START DATE/TIME | 86 |
| | ESTIMATED END DATE/TIME | 87 |
| JOB STATUS | | 88 |

FIG. 9

DEVICE MANAGEMENT INFO

| DEVICE ID | | 90 |
|---|---|---|
| STATUS | CONTROL | 91 |
| | DEVICE | 92 |
| DEVICE INFO | PRINTER INFO | 93 |
| | SCANNER INFO | 94 |
| JOB LIST | | 95 |
| ESTIMATED JOB END DATE/TIME | | 96 |

CONTROLLER, IMAGE FORMING SYSTEM, CALIBRATION CONTROL METHOD, CALIBRATION CONTROL PROGRAM, AND MEMORY MEDIUM STORING THEREIN CALIBRATION CONTROL PROGRAM

BACKGROUND OF THE INVENTION

1. Field of the Invention

The invention relates to a calibration setting apparatus, an image forming system, an image forming apparatus, a calibration setting method, and a memory medium. More particularly, the invention relates to a calibration setting apparatus, an image forming system, an image forming apparatus, a calibration setting method, and a memory medium which are suitable to a case where during calibration for stabilizing an output density fluctuation due to a difference among printers or digital copiers or due to an environmental change in temperature, humidity, or the like, inconvenience which is caused by interruption of another print job is prevented and a smooth printing is executed by the available printer or digital copier.

2. Related Background Art

Hitherto, there is a system such that a computer and a printer are connected so that they can communicate data, print data is transmitted from the computer to the printer, and a printing is executed. In the conventional system, as printer statuses on a server, there are printer statuses such as: "Ready" showing that the printer is in a printable mode; "Busy" showing that the printer is printing; "Error" showing that the printer is in an unprintable mode due to an error; "OFFLine" showing a state where no printer is connected to the server; and the like. Merely, the same statuses as those managed by the printer itself are also managed on the server.

SUMMARY OF THE INVENTION

However, the above conventional technique has the following problems. That is, when patch data for calibrating the printer is printed by the printer to be calibrated, the printer status has to be "Ready". However, if another print job is inputted to the printer at this time, the print data is printed by the printer which is being calibrated, so that there is a problem such that there is a case where a desired print result cannot be obtained, the calibrating operation is not smoothly executed, or the like.

The invention is made in consideration of the above problems and it is an object of the invention to provide a calibration setting apparatus, an image forming system, an image forming apparatus, a calibration setting method, and a memory medium, in which a job regarding the calibrating operation is executed to a device and inconvenience such that a general job other than the calibrating operation is erroneously executed by a printer or a copier which is being calibrated can be prevented.

BRIEF DESCRIPTION OF THE DRAWINGS

FIG. 5 is an explanatory diagram showing contents of job management information according to the first embodiment of the invention;

FIG. 6 is an explanatory diagram showing contents of printer management information according to the first embodiment of the invention;

FIG. 8 is an explanatory diagram showing contents of job management information according to the second embodiment of the invention;

FIG. 9 is an explanatory diagram showing contents of device management information according to the second embodiment of the invention;

DETAILED DESCRIPTION OF THE PREFERRED EMBODIMENTS

An essence of the present invention will be first described prior to explaining embodiments of the invention. According to the invention, in job management of a server, job management information and printer management information (device management information) are provided, besides printer statuses (device statuses) which are managed by a printer (device) itself, a control status is provided as printer management information (device management information), and a status value showing that calibration is being executed is added to the control status.

During the calibration, a general job is not assigned to the printer (device) but assigned to another available printer (device) and executed. A job which is related to the calibration is executed as it is by the printer (device) which is being calibrated. Embodiments of the invention will be described hereinbelow in detail with reference to the drawings.

First Embodiment

Figure 1:
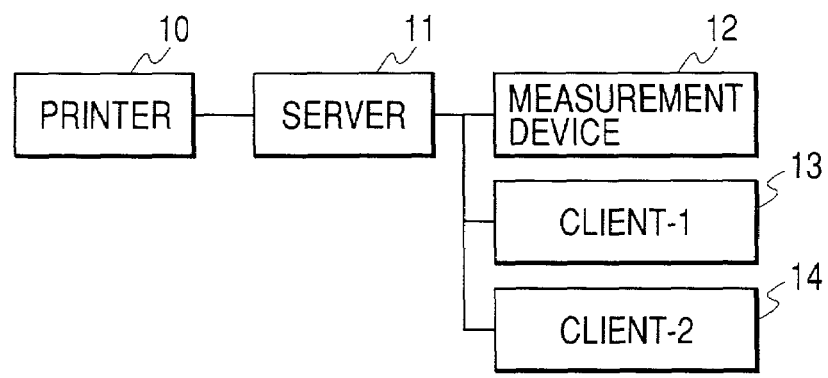
FIG. 1 is a block diagram showing an example of a construction of an image forming system comprising a printer, a server, and a measurement device according to the first and second embodiments of the invention.

FIG. 1 is a block diagram showing an example of a construction of a fundamental image forming system according to the first embodiment of the invention. The image forming system according to the first embodiment of the invention comprises: a printer 10 serving as an image forming apparatus; a server 11; a measurement device 12; and clients 13 and 14.

The above construction will be described in detail. The server 11 is constructed so that it can communicate data with the printer 10. The server 11 transmits print data to the printer 10, thereby allowing the printer 10 to execute a printing. For example, the server 11 receives print data from the client 13 or 14 and transmits the received print data to the printer 10. If there are a plurality of printers, the printer which processes the received print data is selected from the plurality of printers and the print data is transmitted to the selected printer.

When the calibration for stabilizing an output density fluctuation due to a difference among the printers 10 or due to an environmental change in temperature, humidity, or the like is executed, the server 11 transmits patch image data to the printer 10, thereby allowing the printer to execute the printing, and allows the measurement device 12 to measure a density of a patch printed by the printer 10. Calibration data is calculated by the server 11.

When the print data is transmitted to the printer 10, the calibration data calculated by the server 11 is directly applied to print target image data by the server 11 or downloaded into the printer 10 and applied to the image data by the printer 10 prior to executing the printing.

Figure 2:
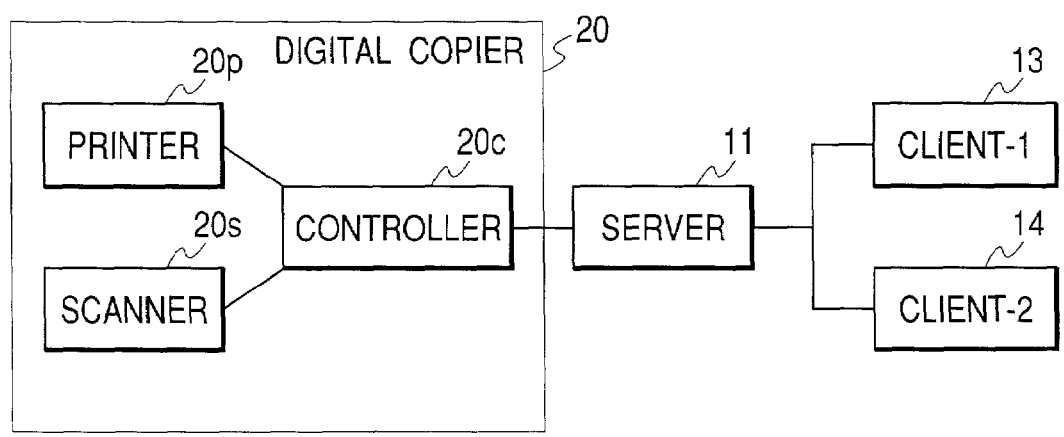
FIG. 2 is a block diagram showing an example of a construction of an image forming system comprising a digital copier and a server according to the first and second embodiments of the invention.

FIG. 2 is a block diagram showing an example of another construction of the image forming system according to the first embodiment of the invention. The image forming system according to the first embodiment of the invention comprises: the server 11; and a digital copier 20 serving as an image forming apparatus. Further, the digital copier 20 comprises a printer 20*p*, a scanner 20*s*, and a controller 20*c*.

The above construction will be described in detail. When the server 11 transmits print data to the digital copier 20, in the digital copier 20, the print data is sent to the printer 20*p* via the controller 20*c*, thereby allowing the printer to execute the printing.

When the calibration of the printer 20*p* is executed, the server 11 transmits patch image data to the digital copier 20, thereby allowing the printer 20*p* to execute the printing on the basis of the patch image data. A printed patch is read by the scanner 20*s*. The server 11 performs a luminance/density conversion, measures a density of the patch, and calculates calibration data.

When the digital copier 20 transmits the print data, the calibration data calculated by the server 11 is directly applied to print target image data by the server 11 or downloaded into the digital copier 20 and applied to the image data by the printer 20*p* prior to executing the printing.

Figure 3:
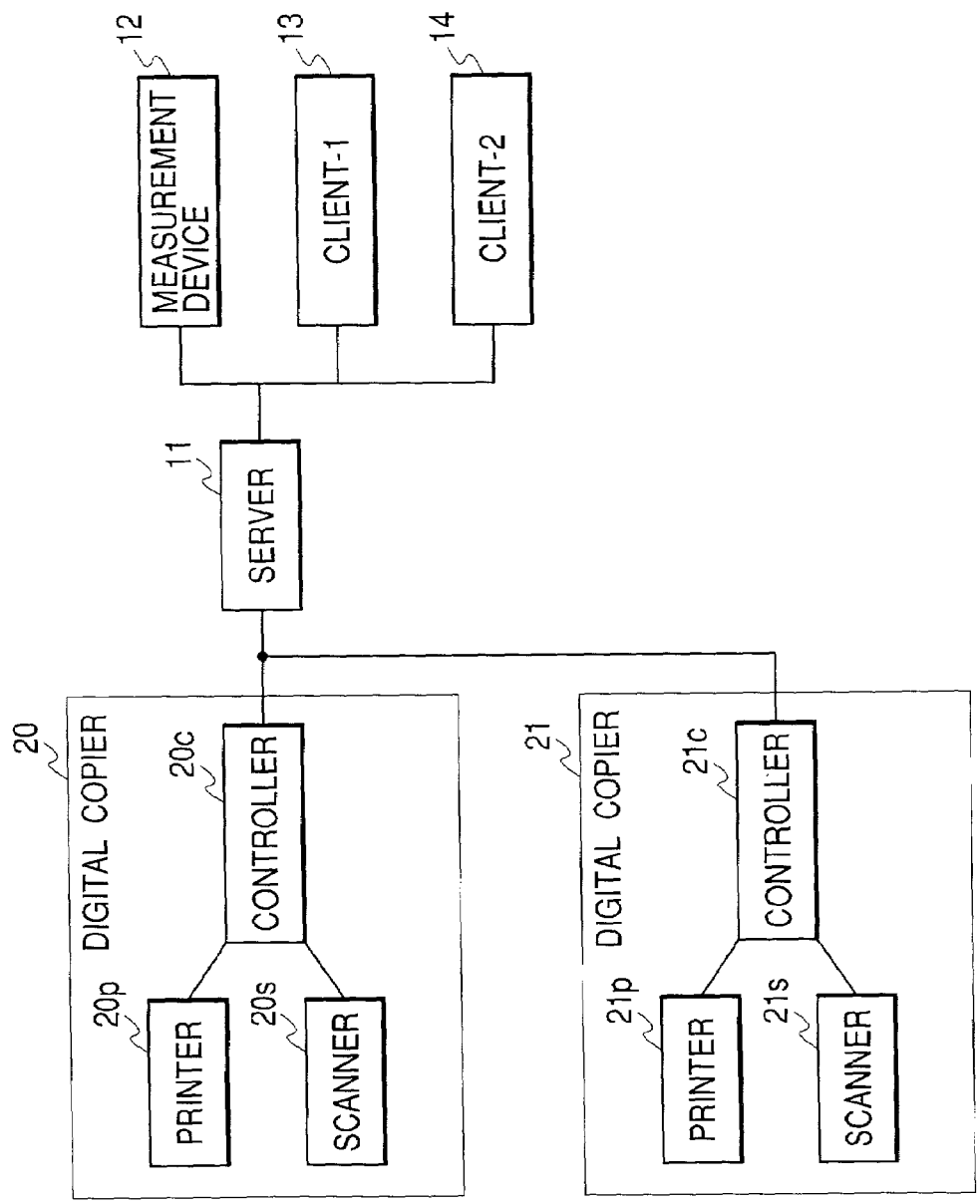
FIG. 3 is a block diagram showing an example of a construction of an image forming system comprising two digital copiers, a server, and a measurement device according to the first and second embodiments of the invention.

FIG. 3 is a block diagram showing an example of another construction of the image forming system according to the first embodiment of the invention. The image forming system according to the first embodiment of the invention comprises: the server 11; and, for example, two digital copiers 20 and 21 serving as image forming apparatuses. Further, the digital copier 20 comprises the printer 20*p*, scanner 20*s*, and controller 20*c* and the digital copier 21 comprises a printer 21*p*, a scanner 21*s*, and a controller 21*c*.

The above construction will be described in detail. The server 11 first determines which digital copier executes the printing and transmits the print data to the decided digital copier. Processes in the digital copiers 20 and 21 are similar to those described above in FIG. 2.

When the calibration of the printer 20*p* of the digital copier 20 is executed, the server 11 transmits patch image data to the digital copier 20, thereby allowing the printer 20*p* to execute the printing on the basis of the patch image data. The measurement device 12, scanner 20*s*, or scanner 21*s* reads the printed patch and measures a density of the patch.

The server 11 calculates calibration data. The calculated calibration data is applied in the same manner as that described above in conjunction with FIG. 2.

Although FIG. 3 shows the example of the construction such that two digital copiers are connected to the server, a construction such that three or more digital copiers are connected to the server or a construction such that besides the digital copiers, one or more printers are connected to the server also has contents similar to those mentioned above. The image forming systems shown in FIGS. 1 to 3 and an image forming apparatus according to the scope of claim for a patent denote an apparatus which includes the foregoing printers and digital copiers and forms an image onto a memory medium such as a paper or the like.

Figure 12:
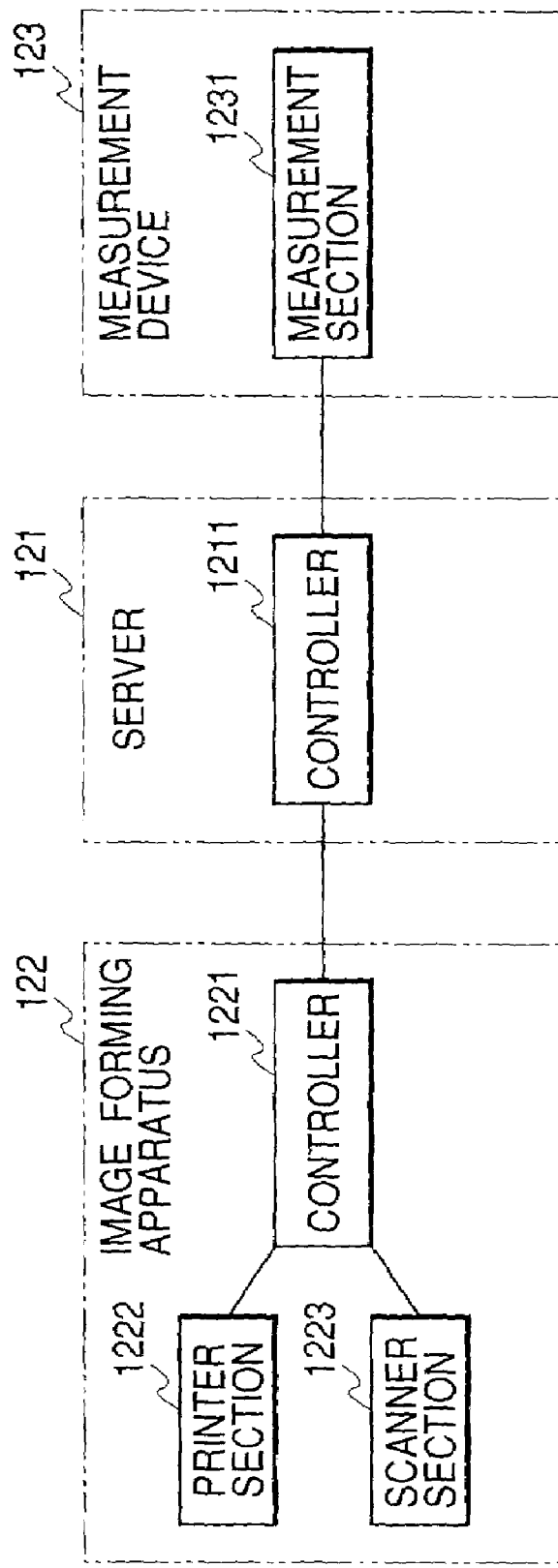
FIG. 12 is a block diagram showing a construction corresponding to a scope of claim for a patent in the image forming system according to the first and second embodiments of the invention.

FIG. 12 is a block diagram showing a construction corresponding to the scope of claim for a patent in the image forming system. The image forming system according to the invention comprises: a server 121 (controller); and an image forming apparatus 122 (image forming apparatus). This diagram shows essential elements and other elements which are not directly concerned with the essence of the present invention are omitted here. The number of image forming apparatuses which are installed can be set to an arbitrary value.

The above construction will be described in detail. The server 121 and image forming apparatus 122 are constructed so that they can communicate data, and the server 121 and a measurement device 123 are constructed so that they can communicate data, respectively. In the server 121, a controller 1211 communicates data with a controller 1221 of the image forming apparatus 122, performs job management shown in FIG. 4 (the first embodiment) and job management shown in FIG. 7 (the second embodiment), which will be explained hereinlater, and controls the execution of processes shown in a flowchart of FIG. 10 (the first embodiment) and a flowchart of FIG. 11 (the second embodiment), which will be explained hereinlater, on the basis of a program for executing a calibration setting method of the invention, respectively.

In the image forming apparatus 122, the controller 1221 makes data communication with the controller 1211 of the server 121 and controls the image forming operation in a printer section 1222 and the image reading operation in a scanner section 1223. The scanner section 1223 reads an image from an original. In the measurement device 123, a measurement section 1231 makes data communication with the controller 1211 of the server 121 and measures a print density of a printed matter.

Figure 4:
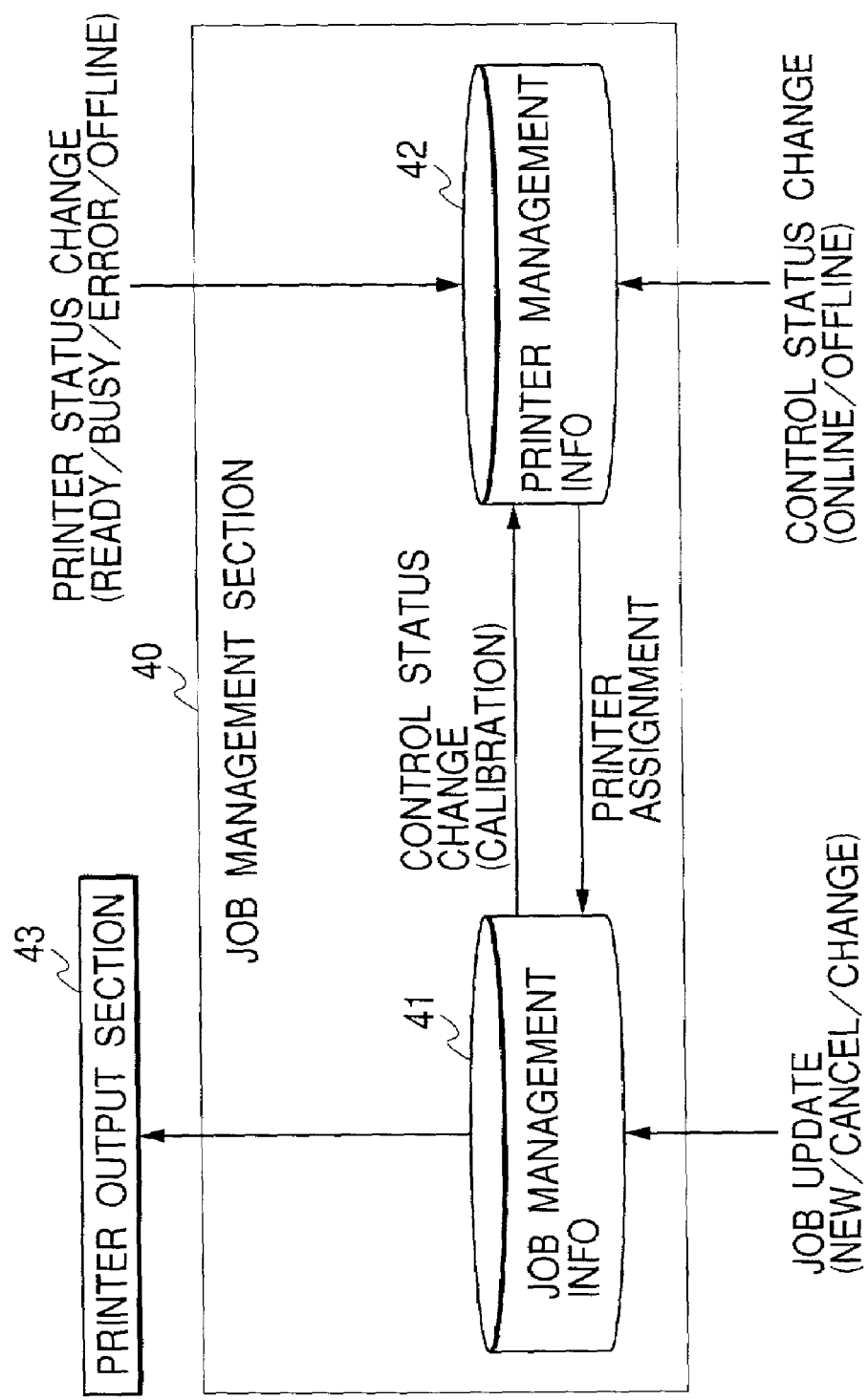
FIG. 4 is a block diagram showing print job management according to the first embodiment of the invention.

The operation in the image forming system according to the first embodiment of the invention constructed as mentioned above will be described in detail hereinbelow with reference to FIGS. 4, 5, 6, and 10. FIG. 4 is a block diagram showing a construction of functions of the server according to the first embodiment of the invention. A flow of processes in case of performing print job management is shown here. A new print job and job updating information indicative of a cancellation of the print job, a change in print job, or the like are sent to a job management section 40. The sent information regarding the print job is held in job management information 41.

FIG. 5 is a diagram showing a data construction of the job management information 41. A job ID 50 is used for identifying the job. A date/time 51 shows the date and time when the job is inputted. A priority 52 indicates a priority of the job and is assigned so that the job having a high priority is preferentially executed. If the priorities are the same, the job whose date/time when it is inputted is earlier is preferentially executed. A paper size/quantity 53 shows a paper size and the number of papers which are used in the print data.

A printer ID 54 of the printer to output indicates a printer to which the job has been assigned. A print order 55 of outputting indicates an order of printing which is executed by the printer. An estimated start date/time 56 is an estimated date/time at which the job is started. An estimated end date/time 57 is an estimated date/time at which the job is finished. A job status 58 indicates a current status of the job.

FIG. 6 is a diagram showing a data construction of printer management information 42. The printer management information 42 is information for managing the statuses of the printer. A printer ID 60 is used for identifying the printer. A control status 61 and a printer status 62 are provided as statuses. A value of the control status 61 is one of "ONLine", "OFFLine", and "Calibration". During the calibration, the control status 61 is set to "Calibration". When the printer is disconnected, the status is set to "OFFLine". In other cases, the status is set to "ONLine".

A value of the printer status 62 is one of "Ready", "Busy", "Error", and "OFFLine". When the printer is disconnected, the printer status 62 is set to "OFFLine". During the printing, the status is set to "Busy". When the printing is impossible due to an error, the status is set to "Error". When the printing is possible, the status is set to "Ready". The printer status 62 is the same as the status managed by each printer itself and updated by a change in status of the printer.

A printer info 63 is information about the printer. A job list 64 indicates a list of jobs in the printer. An estimated job end date/time 65 indicates a date or a time at which processing of all the jobs in the printer may be terminated.

When the updating of the job, the change in printer status, or the change in control status occurs, the job management section 40 changes the assignment of the printer for processing the job with respect to the job or updates the job management information 41 and printer management information 42. A printer output section 43 receives the job to be executed from the job management section 40 and outputs it to the printer assigned to the received job.

Figure 10:
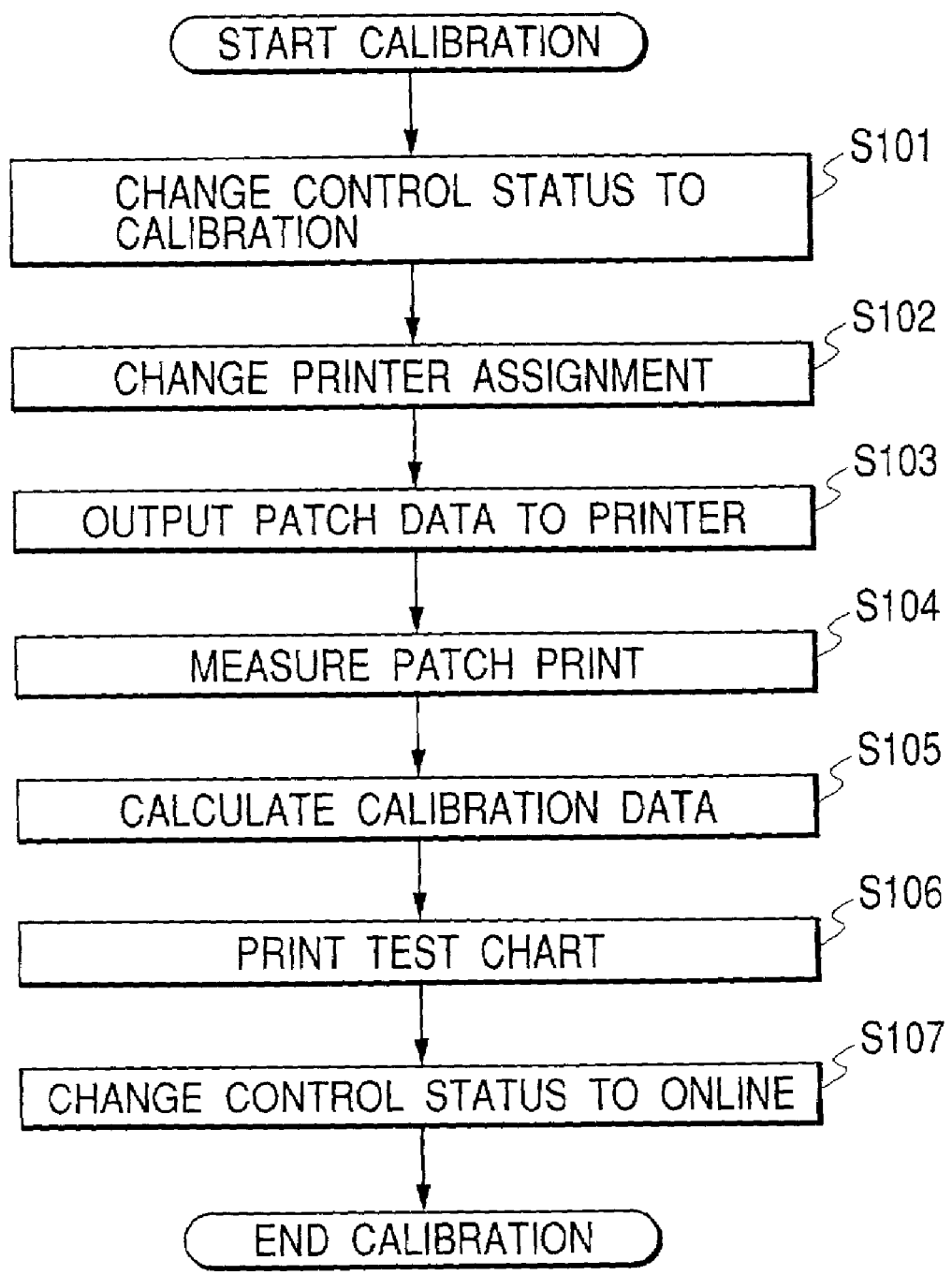
FIG. 10 is a flowchart showing processes of calibration according to the first embodiment of the invention.

FIG. 10 is a processing flow in a range from the start to the end of the calibration according to the first embodiment of the invention. Those processes are executed by the server 11. When a job to execute the calibration is inputted and registered into the job management information 41, in step S101, the control status 61 of the printer is changed to "Calibration". For example, in the system shown in FIG. 3, in case of executing the calibration by the digital copier 20, the job management section 40 changes the control status 61 of the printer management information corresponding to the digital copier 20 to "Calibration".

Since the control status 61 of the printer is changed, the printer assignment of the job is changed in step S102. That is, the job management information is changed so that the job assigned to the printer as a target of the calibration is assigned to another printer. For example, in case of executing the calibration by the digital copier 20 in the system shown in FIG. 3, the job assigned to the digital copier 20 is first detected. The ID of the digital copier 21 is stored into the printer ID 54 of the job management information corresponding to the detected job. If the job which designates the digital copier 20 is inputted after that, in order to assign this job to the digital copier 21, the ID of the digital copier 21 is set into the printer ID 54 corresponding to this job.

Subsequently, in step S103, the patch data is outputted to the printer through the printer output section 43. Thus, the printer executes the printing on the basis of the patch data. As mentioned above, since the job other than the job for calibration is not assigned to the printer whose printer control status 61 is "Calibration", a phenomenon such that the general job is interrupted during the calibration does not occur.

In step S104, the measurement device 12 is allowed to measure the printed patch printed matter. In step S105, calibration data is calculated from the measured data. In step S106, the printer is allowed to print a test chart for confirming an effect of the calibration data. Specifically speaking, print data showing the test chart is formed and outputted to the printer. Since this job is related to the calibration, it is assigned to the printer which is being calibrated and the print data can be printed.

After completion of the printing of the test chart, the control status of the printer is changed to "ONLine" in step S107. Since the control status has been changed, the job is assigned to the printer and even the printer whose calibration was finished can perform the printing.

As described above, according to the image forming system of the first embodiment of the invention, the status of the printer is divided into two kinds of statuses such as printer status and control status and provided as one of the printer management information on the server. The printer status is a status (Ready, Busy, Error, OFFLine) which is also managed by the printer itself. The control status is a status of the printer which is managed on the server side. As a control status, besides "ONLine" and "OFFLine", "Calibration" showing that the calibration is being executed is provided.

During a period of time from the start to the end of the calibration, the control status of the printer is set to "Calibration". When the control status of the printer is "Calibration", although the printing of the patch data, the printing of the test chart, or the like which is the calibration related work can be executed, the printing of other jobs cannot be executed. Thus, even if the print data is inputted to the server 11 while the calibration is being executed in a certain printer, the server controls lest the general print data is supplied to the printer whose calibration is being executed, so that inconvenience during the calibration can be prevented.

That is, by having the status of "Calibration" as a control status of the management information of the device to the printer whose calibration is being executed, the device is allowed to execute the job which is related to the calibrating work, and there is an effect such that it is possible to prevent inconvenience such that the general job other than the calibrating work is erroneously executed by the printer whose calibration is being executed.

Second Embodiment

An image forming system according to the second embodiment of the invention comprises the printer 10, server 11, and measurement device 12 in a manner similar to the first embodiment (refer to FIG. 1).

An image forming system according to the second embodiment of the invention comprises the server 11 and the digital copier 20 having the printer 20p, scanner 20s, and controller 20c in a manner similar to the first embodiment (refer to FIG. 2).

An image forming system according to the second embodiment of the invention comprises: the server 11; the digital copier 20 having the printer 20p, scanner 20s, and controller 20c; and the digital copier 21 having the printer 21p, scanner 21s, and controller 21c in a manner similar to the first embodiment (refer to FIG. 3).

An image forming system according to the second embodiment of the invention comprises: the server 121 having the controller 1211; the image forming apparatus 122 having the controller 1221, printer section 1222, and scanner section 1223; and the measurement device 123 having the measurement section 1231 (refer to FIG. 12) in a manner similar to the foregoing first embodiment.

A construction of each section in the image forming system according to the second embodiment of the invention is similar to that in the first embodiment. Since the construction of each section in the image forming system has been described in detail in the first embodiment, their descriptions are omitted here.

The operation of each section in the image forming system according to the second embodiment of the invention constructed as mentioned above will now be described in detail with reference to FIGS. 7, 8, 9, and 11.

Figure 7:
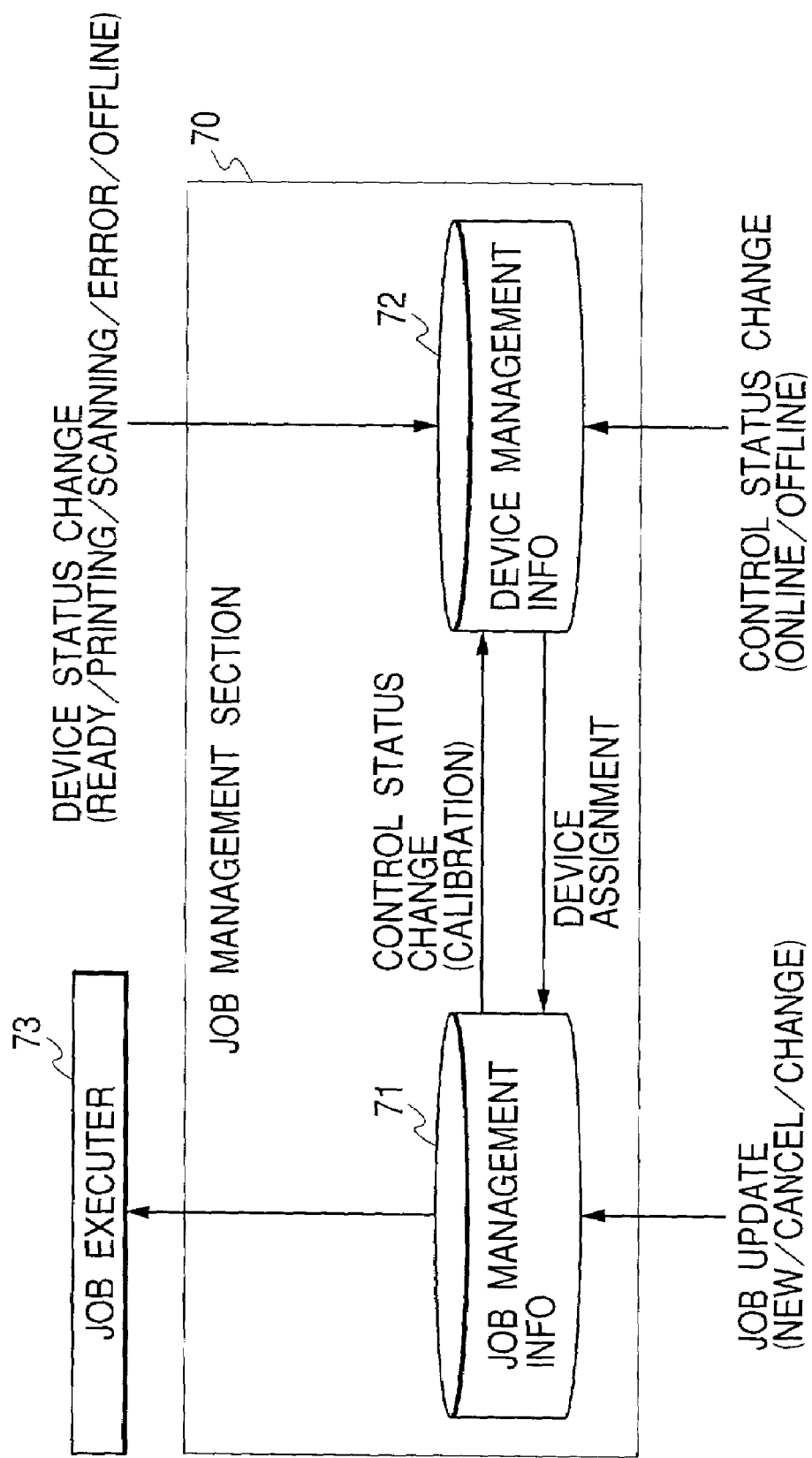
FIG. 7 is a block diagram showing job management of a device according to the second embodiment of the invention.

FIG. 7 is a block diagram showing job management of devices (printer, scanner) of the digital copier in the server according to the second embodiment of the invention. Information indicative of new making, cancellation, and change of a print job or a scan job is sent to a job management section 70. The supplied information of the print job or scan job is held in job management information 71.

FIG. 8 is a diagram showing a data construction of the job management information 71. A job ID 80 is used for identifying the job. A date/time 81 shows the date and time when the job is inputted. A priority 82 indicates a priority of the job and assigned so that the job having a high priority is preferentially executed. If the priorities are the same, the job whose date/time when it is inputted is earlier is preferentially executed. A print/scan and paper size/quantity 83 shows a paper size and the number of papers which are used in the distinction of the printing and the scan and the execution of the job.

A device ID 84 to execute indicates a device to which the job has been assigned. A print/scan order 85 of executing indicates an order at which the print job or scan job is executed by the device. An estimated start date/time 86 is an estimated date/time at which the job is started. An estimated end date/time 87 is an estimated date/time at which the job is finished. A job status 88 indicates a current status of the job.

FIG. 9 is a diagram showing a data construction of device management information 72. The device management information 72 is information for managing the statuses of the device. A device ID 90 is used for identifying the device. A control status 91 and a device status 92 are provided as statuses.

A value of the control status 91 is one of "ONLine", "OFFLine", and "Calibration". During the calibration, the control status 91 is set to "Calibration". When the device is disconnected, the status is set to "OFFLine". In the other cases, the status is set to "ONLine". A value of the device status 92 is one of "Ready", "Printing", "Scanning", "Error", and "OFFLine". When the device is disconnected, the device status 92 is set to "OFFLine". During the printing, the status is set to "Printing". When the printing/scan is impossible due to an error, the status is set to "Error". When the printing/scan is possible, the status is set to "Ready". The device status 92 corresponds to the status managed by each device itself and is updated due to a change in status of the device.

A printer info 93 is information about the printer and a scan info 94 is information about the scanner. A job list 95 indicates a list of jobs in the device. An estimated job end date/time 96 indicates a date or a time at which processing of all the jobs in the device may be terminated.

When the updating of the job, the change in device status, or the change in control status occurs, the job management section 70 changes the assignment of the device for executing the job with respect to the job or updates the job management information 71 and device management information 72. A job executor 73 receives the job to be executed from the job management section 70, outputs the print data to the printer assigned to the received job, or reads data from the scanner assigned to the job.

Figure 11:
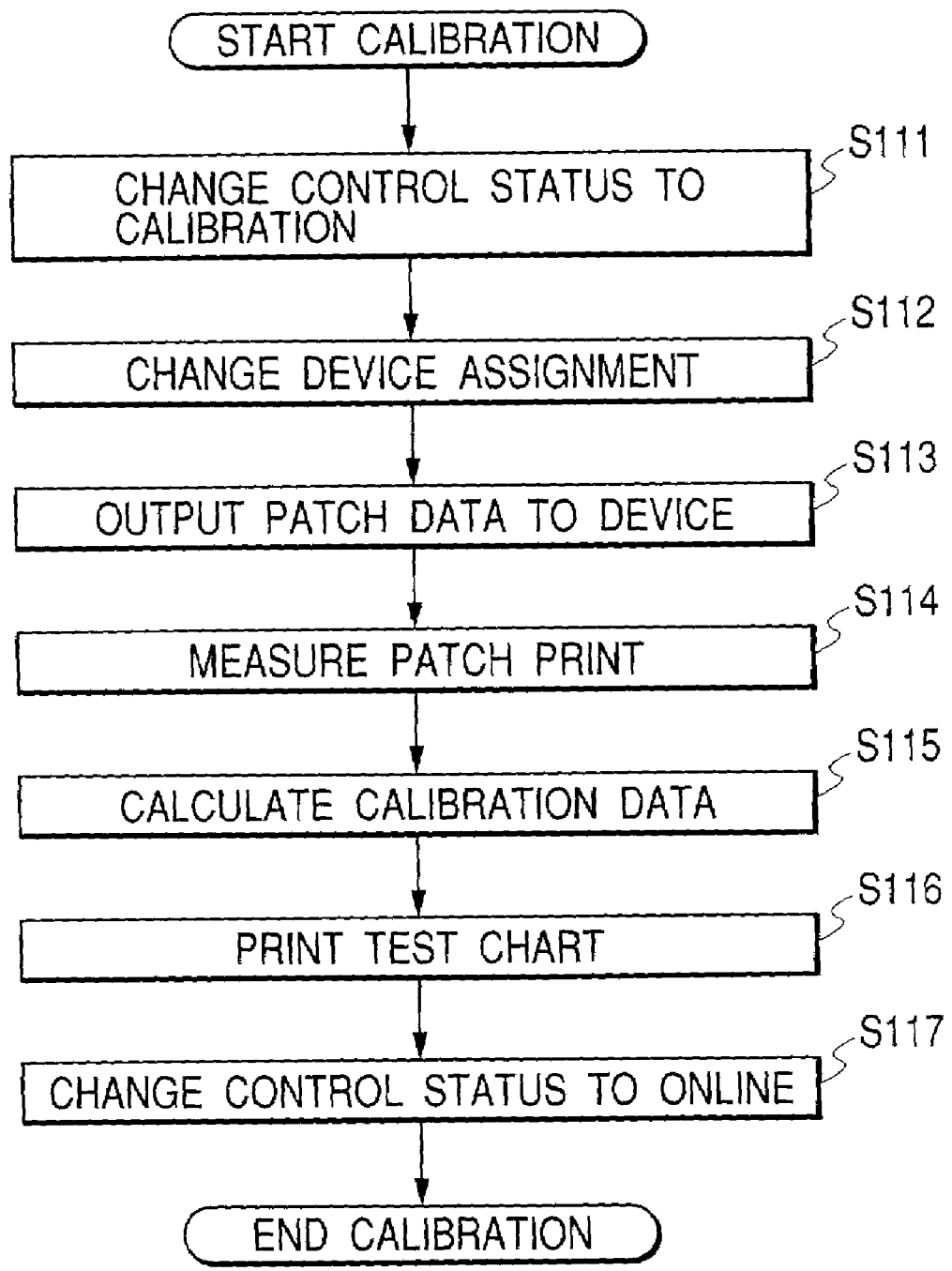
FIG. 11 is a flowchart showing processes of calibration according to the second embodiment of the invention.

FIG. 11 is a flowchart showing processes in a range from the start to the end of the calibration according to the second embodiment of the invention. Those processes are executed by the server 11. When a job to execute the calibration is registered into the job management information 71, the control status 91 of the device is changed to "Calibration" in step S111. For example, in the system shown in FIG. 3, in case of executing the calibration by the digital copier 20, the job management section 70 changes the control status 91 of the device management information corresponding to the digital copier 20 to "Calibration".

Since the control status 91 of the device is changed, the device assignment of the job is changed in step S112. That is, the job management information is changed so that the job assigned to the device as a target of the calibration is assigned to another device. For example, in case of executing the calibration by the digital copier 20 in the system shown in FIG. 3, the job assigned to the digital copier 20 is first detected. The ID of the digital copier 21 is stored into the device ID 84 of the job management information corresponding to the detected job. If the job which designates the digital copier 20 is inputted after that, in order to assign this job to the digital copier 21, the ID of the digital copier 21 is set into the device ID 84 corresponding to this job.

Subsequently, in step S113, the patch data is outputted to the device through the job executor 73. Thus, the device executes the printing on the basis of the patch data. As mentioned above, since the job other than the job for calibration is not assigned to the device whose control status 91 is "Calibration", a phenomenon such that the general job interrupts during the calibration does not occur.

In step S114, the printed patch print is measured by using the measurement device 12 or the scanner 20s or 21s. Since this measurement is related to the calibration, the scanner of the device whose calibration is being executed can read the patch print.

In step S115, calibration data is calculated from the measured data. In step S116, the device is allowed to print a test chart for confirming an effect of the calibration data. Since this job is related to the calibration, it is assigned to the device whose calibration is being executed and the printing can be performed.

After completion of the printing of the test chart, the control status of the device is changed to "ONLine" in step S117. Since the control status has been changed, the job is assigned to the device again and the printing or scan of the general data is made possible from the device whose calibration has been finished.

As described above, according to the image forming system of the second embodiment of the invention, the status of the digital copier is divided into two kinds of statuses such as device status and control status and provided as one of the device management information on the server. The device status is a status (Ready, Printing, Scanning, Error, OFFLine) which is also managed by the copier itself. The control status is a status of the digital copier which is managed on the server side. As a control status, besides "ONLine" and "OFFLine", "Calibration" showing that the calibration is being executed is provided.

During a period of time from the start to the end of the calibration, the control status of the device of the digital copier is set to "Calibration". When the control status of the device is "Calibration", although the printing of the patch data, the printing of the test chart, or the like which is the calibration related work can be executed, the printing of other general data cannot be executed. Thus, even if the job is inputted to the server 11 while the calibration is being executed in a certain device, the server controls lest the general print data is supplied to the device whose calibration is being executed, so that there is an effect such that inconvenience during the calibration can be prevented.

That is, by having the status of "Calibration" as a control status of the device management information for the digital copier whose calibration is being executed, the device is allowed to execute the job which is related to the calibrating work, and there is an effect such that it is possible to prevent inconvenience such that the general job other than the calibrating work is erroneously executed by the device of the copier whose calibration is being executed. There is also an effect such that even while the calibration of one device in the digital copier is being executed, another device is enabled to execute the general job.

Other Embodiments

Although the constructions shown in FIGS. 1 to 3 have been mentioned as examples of the image forming system in the first and second embodiments of the invention mentioned above, the invention is not limited to them but the number of printers, digital copiers, or the like which are installed can be set to an arbitrary value.

Although the measurement device for measuring the print density of the printed matter has been provided separately from the server in the first and second embodiments of the invention mentioned above, the invention is not limited to them but the server can also have the function of the measurement device.

The invention can be applied to a system comprising a plurality of apparatuses or to an apparatus comprising one device. Naturally, the functions of the embodiments mentioned above can be also accomplished by a method whereby a memory medium in which program codes of software for realizing the functions of the embodiments have been stored is supplied to a system or an apparatus and a computer (a CPU or an MPU) of the system or apparatus reads out and executes the program codes stored in the memory medium.

In this case, the program codes themselves read out from the memory medium realize the functions of the embodiments mentioned above and the memory medium in which the program codes have been stored constructs the invention. As a memory medium to supply the program codes, for example, it is possible to use a floppy disk, a hard disk, an optical disk, a magnetooptic disk, a CD-ROM, a CD-R, a magnetic tape, a non-volatile memory card, an ROM, or the like.

The invention incorporates not only a case where the functions of the embodiments mentioned above are realized by a method whereby a computer executes the program codes which were read out but also a case where an OS or the like which is operating on a computer executes a part or all of the actual processes on the basis of instructions of the program codes, and the functions of the embodiments mentioned above are realized by those processes.

Further, the invention also incorporates a case where the program codes read out from a memory medium are written into a memory equipped for a function expanding board inserted in a computer or a function expanding unit connected to a computer and, thereafter, a CPU or the like provided for the function expanding board or function expanding unit executes a part or all of the actual processes on the basis of instructions of the program codes, and the functions of the embodiments mentioned above are realized by those processes.

Figure 14:
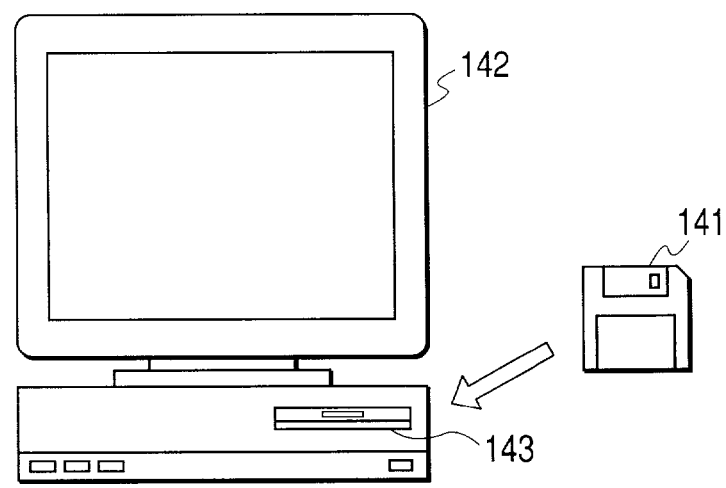
FIG. 14 is an explanatory diagram showing an example of a concept that the program for executing the calibration setting method of the invention and the program related data are supplied from the memory medium to the apparatus.

FIG. 14 is an explanatory diagram showing an example of a concept that a program for executing the calibration setting method of the invention and program related-data are supplied from the memory medium to the apparatus. The program for executing the calibration setting method of the invention and program related-data are supplied by inserting a memory medium 141 such as floppy disk, CD-ROM, or the like into an inserting port 143 of a memory medium drive equipped for an apparatus 142 such as a computer or the like. After that, the program for executing the calibration setting method of the invention and program related-data are installed once from the memory medium 141 onto a hard disk and loaded from the hard disk into an RAM or directly loaded into the RAM without being installed onto the hard disk, thereby enabling the program and the program related data of the invention to be executed.

In this case, in the image forming system according to the first and second embodiments of the invention, in case of executing the program for executing the calibration setting method of the invention, for example, the program and the program related data are supplied to each apparatus constructing the image forming system by the procedure as described with reference to FIG. 14 or the program and the program related data are preliminarily stored into each apparatus constructing the image forming system, so that the program can be executed.

Figure 13:
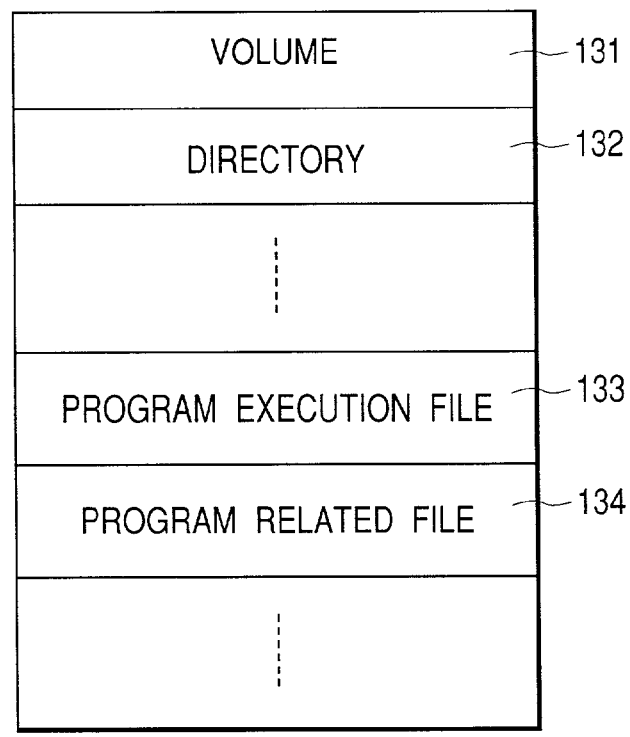
FIG. 13 is an explanatory diagram showing memory contents of a memory medium in which a program for executing a calibration setting method of the invention and program related data have been stored.

FIG. 13 is an explanatory diagram showing an example of a construction of storage contents of the memory medium in which the program for executing the calibration setting method of the invention and the program related data have been stored. The memory medium is constructed by the storage contents such as volume 131, directory 132, program execution file 133, program related file 134, and the like. The program for executing the calibration setting method of the invention is a program converted into program codes on the basis of each flowchart of FIG. 10 (the first embodiment) and FIG. 11 (the second embodiment).

As described above, according to the invention, as a control status of the management information of the device to the printer or copier whose calibration is being executed, by having the control status showing that the calibration is being executed, the device is allowed to execute the job which is related to the calibrating work, and there is an effect such that it is possible to prevent inconvenience such that the general job other than the calibrating work is erroneously executed by the printer or copier whose calibration is being executed. There is also an effect such that even while the calibration of one device is being executed, another device is enabled to execute the general job.

What is claimed is:

1. A controller which can communicate with a plurality of image forming apparatuses for executing a job and transmit to one of the plurality of image forming apparatuses data for performing calibration of the image forming apparatus, comprising:

a memory unit adapted to store first information showing that the calibration of one of the plurality of image forming apparatuses is executed and second information showing that the one of the plurality of image forming apparatuses is ready to accept a job; and a job managing unit adapted to assign to another of the plurality of image forming apparatuses a job assigned to the one of the plurality of image forming apparatuses, in the event that the first information is stored by said memory unit even if the second information is stored by said memory unit.

2. A controller according to claim 1, wherein each of the plurality of image forming apparatuses is a printer, and said job managing unit assigns to another of the plurality of printers a job for instructing to print which was assigned to one of the plurality of printers which corresponds to the stored information.

3. A controller according to claim 1, wherein each of the plurality of image forming apparatuses is a copier having a function for reading an image, and said job managing unit assigns to another of the plurality of copiers a job for instructing to print and a job for instructing to read the image which were assigned to one of the plurality of copiers which corresponds to the stored information.

4. A controller according to claim 1, wherein the calibration is a process for stabilizing an output density fluctuation due to a difference among the plurality of image forming apparatuses or due to an environmental change in temperature or humidity.

5. A controller according to claim 1, further comprising a control unit adapted to output print data for performing the calibration of the image forming apparatus to the image forming apparatus, calculate calibration data from a measurement result of a printed matter, and output print data indicative of the calculated calibration data to the image forming apparatus.

6. A controller according to claim 1, wherein said memory unit stores a job and an identifier indicative of the image forming apparatus to which said the job has been assigned so as to correspond to each other, and wherein said job managing unit changes the identifier corresponding to the job assigned to the one of the plurality of image forming apparatuses to an identifier of another of the plurality of image forming apparatuses.

7. A method of controlling calibration of an image forming apparatus, comprising the steps of:

storing first information showing that the calibration of one of a plurality of image forming apparatuses is executed;

storing second information showing that the one of the plurality of image forming apparatuses is ready to accept a job; and assigning to another of the plurality of image forming apparatuses a job assigned to the one of the plurality of image forming apparatuses, in the event that the first information is stored in said first storing step even if the second information is stored in said second storing step.

8. A method according to claim 7, wherein when each of the plurality of image forming apparatuses is a printer, a job for instructing to print which was assigned to one of the plurality of printers which corresponds to the stored information to another of the plurality of printers.

9. A method according to claim 7, wherein when each of the plurality of image forming apparatuses is a copier having a function for reading an image, a job for instructing to print and a job for instructing to read the image which were assigned to one of the plurality of copiers which corresponds to the stored information.

10. A method according to claim 7, wherein the calibration is a process for stabilizing an output density fluctuation due to a difference among the plurality of image forming apparatuses or due to an environmental change in temperature or humidity.

11. A method according to claim 7, further comprising a control step of outputting print data for performing the calibration of the image forming apparatus to the image forming apparatus, calculating calibration data from a measurement result of a printed matter, and outputting print data indicative of the calculated calibration data to the image forming apparatus.

12. A method according to claim 7, further comprising the steps of:

storing a job and an identifier indicative of the image forming apparatus to which the job has been assigned so as to correspond to each other, and changing the identifier corresponding to the job assigned to the one of the plurality of image forming apparatuses to an identifier of another of the plurality of image forming apparatuses.

13. A computer-readable storage medium storing a computer-executable program such that, when executed by a computer, the program causes the computer to execute a method for controlling calibration of an image forming apparatus, the method comprising:

a memory step of storing first information showing that the calibration of one of a plurality of image forming apparatuses is executed and second information showing that the one of the plurality of image forming apparatuses is ready to accept a job; and a job managing step of assigning to another of the plurality of image forming apparatuses a job assigned to the one of the plurality of image forming apparatuses, in the event that the first information is stored in said memory step even if the second information is stored in said memory step.

14. A program according to claim 13, wherein each of the plurality of image forming apparatuses is a printer, and in said job managing step, a job for instructing to print which was assigned to one of the plurality of printers which corresponds to the stored information.

15. A program according to claim 13, wherein each of the plurality of image forming apparatuses is a copier having a function for reading an image, and in said job managing step, a job for instructing to print and a job for instructing to read the image which were assigned to one of the plurality of copiers which corresponds to the stored information whose calibration is being executed are assigned to another of the plurality of copiers.

16. A program according to claim 13, wherein the calibration is a process for stabilizing an output density fluctuation due to a difference among the plurality of image forming apparatuses or due to an environmental change in temperature or humidity.

17. A program according to claim 13, wherein the method further comprises:

an output step of outputting print data for performing the calibration of the image forming apparatus to the image forming apparatus;

a calculating step of calculating calibration data from a measurement result of a printed matter; and a control step of outputting print data indicative of the calculated calibration data to the image forming apparatus.

18. A program according to claim 13, wherein in said storing step, a job and an identifier indicative of the image forming apparatus to which the job has been assigned are stored so as to correspond to each other, and in said job managing step, the identifier corresponding to the job assigned to the one of the plurality of image forming apparatuses is changed to an identifier of another of the plurality of image forming apparatuses.

19. A controller which can communicate with a plurality of image forming apparatuses for executing a job and transmit to one of the plurality of image forming apparatuses data for performing calibration of the image forming apparatus, comprising:

a memory unit adapted to store first information showing that the calibration of one of the plurality of image forming apparatuses is executed and second information showing that the one of the plurality of image forming apparatuses is ready to accept a job; and a job managing unit adapted to assign a job to another of the plurality of image forming apparatuses without assigning the job to the one of the plurality of image forming apparatuses, in the event that the first information is stored by said memory unit even if the second information is stored by said memory unit.

20. A method of controlling calibration of an image forming apparatus, comprising the steps of:

storing first information showing that the calibration of one of a plurality of image forming apparatuses is executed;

storing second information showing that the one of the plurality of image forming apparatuses is ready to accept a job; and assigning a job to another of the plurality of image forming apparatuses without assigning the job to the one of the plurality of image forming apparatuses, in the event that the first information is stored in said first storing step even if the second information is stored in said second storing step.

* * * * *